No. 714,798. Patented Dec. 2, 1902.
J. M. HEWITT & W. G. RHODES.
SLIPPER BRAKE FOR TRAMWAY CARS.
(Application filed Nov. 2, 1901.)

(No Model.) 2 Sheets—Sheet 1.

WITNESSES.
Joseph Bates
E. Howard

INVENTORS.
J. M. Hewitt
Wm. G. Rhodes
by O. Owens O'Brien

THE NORRIS PETERS CO., PHOTO-LITHO., WASHINGTON, D. C.

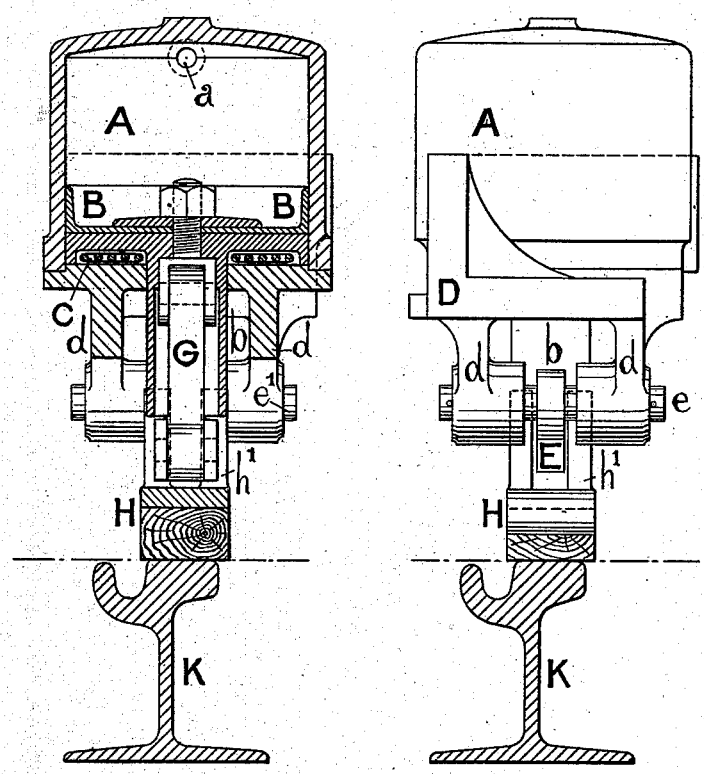

UNITED STATES PATENT OFFICE.

JAMES MITCHELL HEWITT AND WILLIAM GOULD RHODES, OF MANCHESTER, ENGLAND.

SLIPPER-BRAKE FOR TRAMWAY-CARS.

SPECIFICATION forming part of Letters Patent No. 714,798, dated December 2, 1902.

Application filed November 2, 1901. Serial No. 80,958. (No model.)

*To all whom it may concern:*

Be it known that we, JAMES MITCHELL HEWITT and WILLIAM GOULD RHODES, British subjects, and residents of Manchester, in the county of Lancaster, England, have invented certain new and useful Improvements in Slipper-Brakes for Tramway-Cars and other Vehicles, of which the following is a specification.

This invention is designed to provide an effective brake, such as is known as a "slipper-brake," more particularly for tramway-cars, to be applied to the rails on which the car travels.

Although brakes have already been applied direct to the rails upon which cars or vehicles travel, they have hitherto not been constructed to be applied in an effective and expeditious manner and have, owing to inherent defects, not proved effective or useful.

This present invention consists, essentially, of a slipper or rail brake actuated by pneumatic (or hydraulic) pressure applied by a cylinder and piston, the piston being connected to levers which are pivoted to and carry the brake-block, the levers being each pivoted to and oscillating upon a fulcrum carried by a bracket fixed to the cylinder.

The invention will be fully described with reference to the accompanying drawings.

Figure 1:
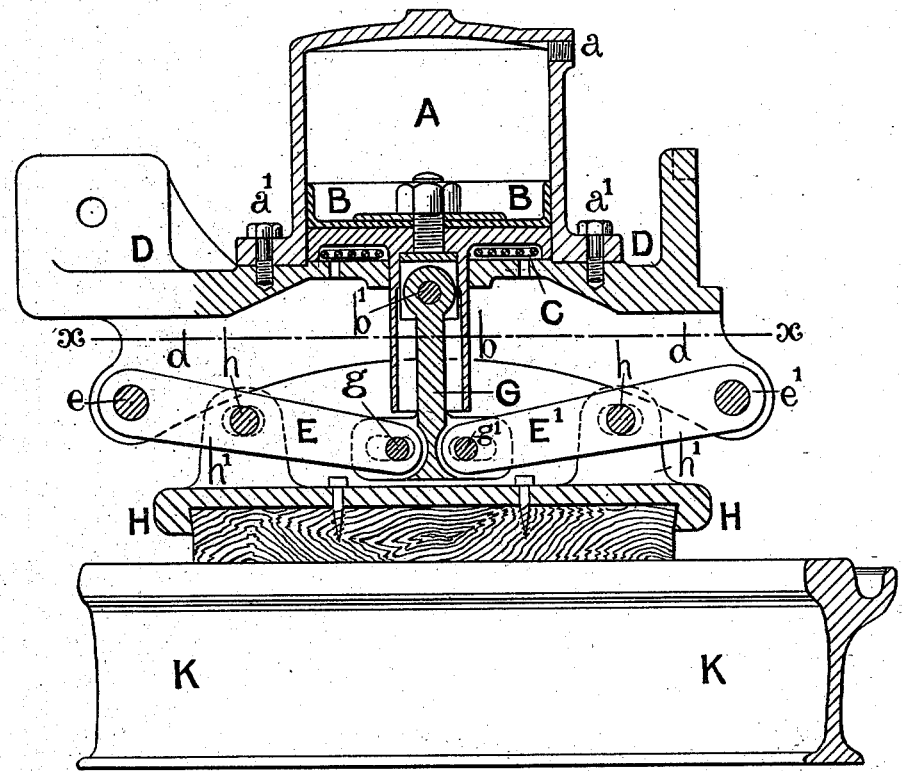
Figure 2:
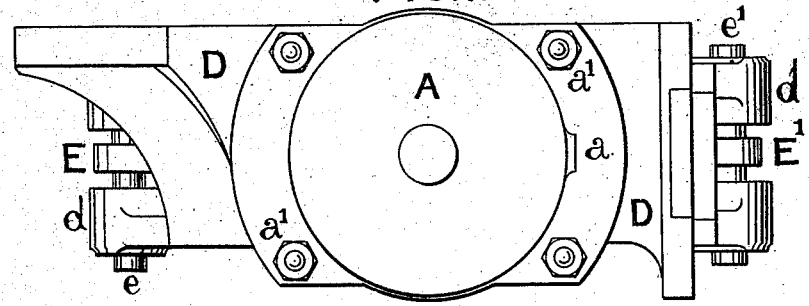
Figure 3:
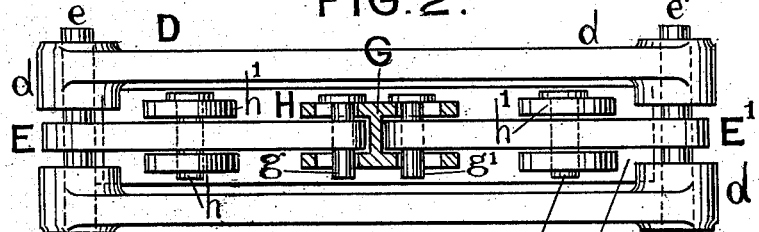

Figure 1 is a longitudinal sectional elevation; Fig. 2, a plan; Fig. 3, a sectional plan on line $x\ x$, Fig. 1; Fig. 4, an end elevation; Fig. 5, a transverse sectional elevation.

A small cylinder A is constructed with a piston B sliding therein, the piston being forced in one direction by air or fluid admitted through the port or aperture $a$ and moved back again in the reverse direction by a spring C, placed between it and the bottom of the cylinder. The spring C is either spiral or volute to lie flat between the bottom of the cylinder and piston when compressed, as shown in Fig. 1. The whole structure is built upon the base or carrying plate D, by which it is secured to the vehicle.

The vertical cylinder A is mounted upon the upper side of base-plate D, to which it is securely attached by the bolts $a'$. The plate D forms a bottom for the cylinder A and a guide for the hollow piston-rod $b$, which projects through it. It is also constructed with two lugs $d$, which provide a fulcrum $e\ e'$ at each end for the two actuating-levers E E', pivoted thereto. The levers E E' at their other or free ends are loosely connected by pins or pivots $g\ g'$ to the outer end of the connecting-rod G, which is pivoted at $b'$ to the piston-rod $b$. The levers E E' are accordingly moved up and down with the piston B.

A slipper-brake block H, to engage direct upon the rail K, is suspended from the levers E E' by pins or pivots $h$, passing through lugs $h'$. The whole structure is compactly arranged to be readily affixed to a car or vehicle of any construction.

When the piston B is forced down by the pneumatic or hydraulic pressure behind it, the brake-block H is pressed against the rails K with an increased pressure, due to the levers E E', and when the pressure in the cylinder is removed the piston and brake are moved in the reverse direction by the spring C.

What we claim as our invention, and desire to protect by Letters Patent, is—

A self-contained slipper-brake for tramway and other vehicles comprising in its construction, a base or carrying plate D by which it is secured to the vehicle, provided with lugs $d$ to which the actuating-levers are pivoted, a vertical pneumatic cylinder A bolted upon the top of the plate, a piston B reciprocating therein forced downward by pneumatic pressure, a spring C inserted between the piston and plate to raise the piston when the pressure on its other side is relieved, a hollow piston-rod $b$ projecting through the plate D which acts as a guide, a connecting-rod G pivoted inside the piston-rod $b$ engaging at its free end with the actuating-levers, two actuating-levers E E' fulcrumed at the outer ends, pivots $e\ e'$ secured in the lugs $d$ each forming a fulcrum, the intermediate pins $h$ through which the force is applied to the brake-block and the brake-block H provided with lugs $h'$ by which it is suspended from the actuating-levers E E' substantially as described.

In witness whereof we have hereunto signed our names in the presence of two subscribing witnesses.

JAMES MITCHELL HEWITT.
WILLIAM GOULD RHODES.

Witnesses:
 J. OWDEN O'BRIEN,
 FRANK SPARKES.